3,360,203
PREREACTED RAW MATERIALS TECHNIQUE FOR ATTAINING HIGH QUALITY CERAMICS
Edward J. Smoke, Metuchen, N.J., and Nicholas H. Snyder, deceased, late of Trenton, N.J., by Wilma E. Snyder, administratrix, Trenton, N.J., assignors, by mesne assignments, to the United States of America as represented by the Secretary of the Navy
Filed June 28, 1965, Ser. No. 467,791
4 Claims. (Cl. 241—15)

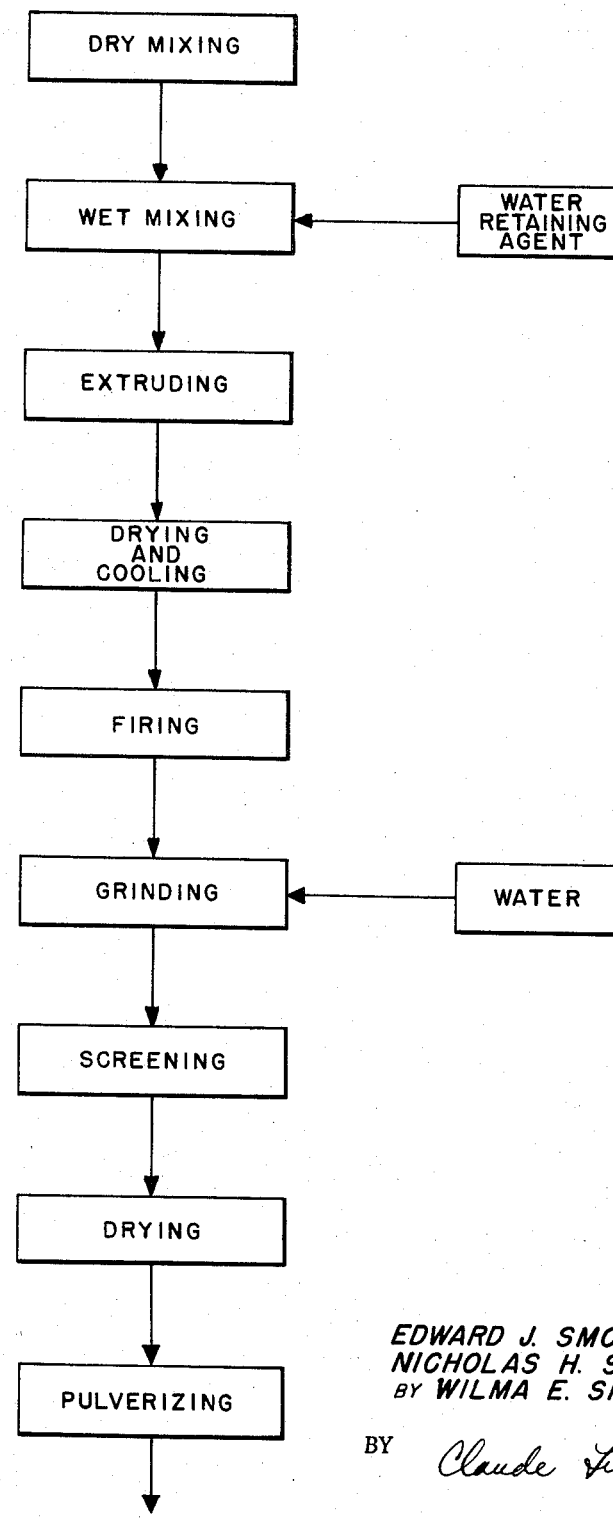

ABSTRACT OF THE DISCLOSURE

A new method of making a high quality alumina ceramic material approaching 100 percent of its true density through the expedient of rather fine grinding and fine particle size distribution, thereby grinding out the voids in the material. Each particle is essentially of the same composition, and when blended by grinding and batch preparation operations are performed any compositional discontinuities are thoroughly distributed.

The invention described herein may be manufactured and used by or for the Government of the United States of America for governmental purposes without the payment of any royalties thereon or therefor.

This invention relates generally to a method of forming high quality ceramics and more particularly to a method of making a high alumina ceramic composition suitable for use in ceramic casting processes.

The quality of ceramics made by conventional processes range from 94% to 87%, and below, of their true density. This same characteristic is also inherent in high alumina ceramics. Further, this variation in quality is found to exist in a single, large specimen of ceramic composition. Thus, the void volume in these ceramics range from 6% to 13% and is a contributing factor to the variations of the ceramic material properties. The primary cause of this deficiency in density is in the conventional batch mixing procedure used in the making of these specimens.

In the prior art methods, the several raw materials are mixed as agglomerants of minerals and chemicals to form a casting slip whose ultimate particle size is quite coarse and generally of a narrow particle size distribution. This characteristic is not conducive to good mixing. Subsequently, after casting of the slip mixture, the thermal reactions do not attain full completion during firing, which results in the entrapment of a rather large volume of voids. Consequently, a poor ceramic material results.

Ceramic materials of true density, i.e., 100% quality, are recognized as being necessary for the development of a successful radome since void volumes in the ceramic have been found to contribute to poor radar transmission. In a conical scanning system of an aerial vehicle, such as a missile, changes in transmission as the antenna moves to different positions can cause beam deflection. Therefore, a radome design which insures high transmission at all the angles of incidence encountered offers a promising means of reducing such deflection errors.

Accordingly, one object of the present invention is to provide a new and improved method of forming high quality ceramics.

Another object of the present invention is to provide a new and improved method of making a high quality alumina ceramic composition.

Still another object of the present invention is the provision of a new and improved method of making ceramic material to within a high percentage approaching 100% of its true density.

A further object of the present invention is to provide a process of making high quality alumina ceramic material suitable for use in the manufacture of high quality electrical apparatus.

A still further object of the present invention is to provide a process of making high quality alumina ceramic material suitable for use in the manufacture of radomes.

In accordance with the invention, the foregoing and other objects are attained by providing a process whereby a composition of clay, talc and alumina is mixed and formed into rod-like lengths which are fired and ground into an alumina body composition suitable for use in ceramic casting processes.

Other objects, advantages and novel features of the present invention will become apparent from the following detailed description of the invention when considered in conjunction with the accompanying drawing wherein:

The sole figure is a flow type block diagram of the process of the present invention.

Referring to the drawing, the process according to the present invention proceeds as follows: a high alumina ceramic composition of clay, talc and alumina is dry mixed in a twin shell blender for a short period of time, preferably one quarter to one half hour. In the present embodiment, the composition consists of 90% alumina, 4% clay and 6% talc. In all instances where a percentage of material is given, it is to be understood that this refers to percentage by weight, not percentage by volume. These percentages are not critical and depend largely upon the temperature requirements and electrical properties desired in the ceramic material. Alumina percentage of 75% to 96% have been used in other experimental processes and have been found to give satisfactory results. This composition is then wet mixed in a muller type mixer with a 27% water solution containing 1% to 2% water retaining agent such as ammonium algenate. A water retaining agent suitable for use in this process is "Superloid," manufactured by Kelco Company, although many commercially available water retaining agents would operate satisfactorily. This mixture is then extruded hydraulically, without de-airing through a die. The openings in the die may vary in number and size without losing their effective purpose. A die found suitable for use in this process has three ⅛ inch diameter openings. The extruded rods are then collected and prepared for drying. The mixture must be of such a consistency that the rods retain their shape during the extruding, handling and drying operations. An electric furnace or similar apparatus may be used to accomplish the drying.

After drying, the rods are prepared for firing and for subsequent grinding. The method of preparation employed in this process is to break the rods into smaller lengths such as ⅛ to ¾ inch long. The rods are then stored until a sufficient quantity is available for firing.

While it is understood any suitable firing kiln may be used, a periodic car type in which the complete end of the kiln is a door which is built on the car has been found to operate highly satisfactorily. The kiln is fired by city gas and air at up to two pounds pressure. To fire the kiln the car is withdrawn from the kiln, loaded and the burners lighted from within. When a sufficient number of the dried rods have been accumulated, they are distributed equally into ceramic boxes or saggers which are placed in the car and pushed in the kiln. The door is bricked in and sealed and the firing continued to completion. The kiln plus the ware is fired to 2780° F. in approximately ten hours. An additional soaking period of one hour is spent at that temperature. After the firing is completed, the bricking is removed and the kiln opened slightly. Twelve to 16 hours later the car is removed from the kiln and the fired material is cool enough to handle. At this point in the process the alumina body has been completely fired and the rods are ready for grinding.

Because the alumina composition will be used in a slip casting process, a fine particle size no greater than 325 mesh (44 microns) or finer is necessary. The grinding step is accomplished in a ball mill which is approximately 2½ feet in length and 2½ feet in diameter. The mill is lined with alumina bricks and contains alumina balls as the grinding media. Alumina is used throughout to minimize contamination during this operation. After grinding, approximately 100% excess water is added to the ball mill in order to form a fluid slurry which can be easily removed.

It has been found that the ball mill should be loaded to ⅝ of its volume with a uniformly distributed amount of pebbles within the approximate range of 13/16 inch in diameter to 1¼ inch diameter. Periodically the smaller pebbles that have been reduced in size during the grinding operation to a diameter less than 13/16 inch are removed. Larger 1¼ inch diameter pebbles are added to maintain the ⅝ volume of grinding media. Thus, it will be appreciated that all the grinding pebbles are being reduced at a substantially uniform rate necessitating the periodic addition of larger particles. Then 110,000 grams of rods and 55,000 cc. of deionized water are added and milled for a period ranging from 12 to 18 hours or until at least 95% of the milled material can pass through a 325 mesh screen. One hundred percent or 118,000 cc. of deionized water is added to the mill, which is run for approximately five minutes, then drained into galvanized or enameled containers. This material is then passed through a 325 mesh screen, dried and passed through a micropulverizer turning at 8,000 r.p.m. using an 0.027 inch round holed screen. The resulting composition is then removed and stored for eventual use as a casting slip in the manufacture of ceramic materials. The mill load including the grinding media, material to be ground, and the fluid system plus the rate and time of milling can be varied to achieve a variety of particle size distributions. Thus, the process can be regulated to produce particle size distribution which will result in optimum quality of the ceramics when made for any of a variety of forming methods.

The quality of the resulting materials is 99% of the true density of the alumina composition. This is due to several factors. The first is that the rather fine grinding and resulting fine particle size distribution essentially grinds the voids out of the material which are present in ceramics fabricated conventionally. Further, the particle size distribution is conducive to attaining a higher prefired bulk density and thus a higher fired bulk density. Each particle is essentially of the same composition and when blended by the grinding and batch preparation operation for making the ceramic materials any compositional discontinuities are thoroughly distributed. Since the reactions are essentially complete during the firing, the particles bond together more easily during the second firing. Each particle contains a small amount of glass which softens and bonds the particles together.

It will be apparent that the method of the herein described invention produces a critically controlled alumina composition for use in the manufacture of ceramic composition materials, such as radomes, where tolerances are extremely small. It will also be obvious to one skilled in the art that although the invention has been described in connection with the manufacture of radomes, it is not so limited and is equally applicable where other high quality ceramic materials are necessary, such as for ceramic seals, electronic parts, ceramic abrasive materials and ceramic pistons and cylinders.

Obviously many modifications and variations of the present invention are possible in the light of the above teachings. It is therefore to be understood that within the scope of the appended claims the invention may be practiced otherwise than as specifically described.

What is claimed is:

1. The method of preparing high quality alumina ceramic compositions, comprising the steps of
   dry mixing an alumina composition;
   wet mixing the composition with a solution of a water retaining agent;
   extruding the composition hydraulically to form rods;
   drying the rods;
   breaking the rods into short lengths;
   firing the broken rods;
   cooling the rods to room temperature;
   grinding the rods with water to form a slurry;
   screening the slurry;
   drying the slurry; and
   pulverizing the resulting mixture to form the alumina body composition.

2. The method of preparing alumina ceramics to be used in the firing of radomes, comprising the steps of
   dry mixing an alumina composition in a blender;
   wet mixing the composition with a solution of a water retaining agent in a muller type mixer;
   extruding the composition hydraulically through a die thereby forming rods;
   drying the rods;
   breaking the rods into lengths ⅛ to ¾ inch long;
   firing the broken rods in a kiln;
   cooling the rods to room temperature;
   grinding the rods with water in a ball mill to form a slurry;
   screening the slurry;
   drying the slurry; and
   passing the resulting mixture through a micropulverizer thereby forming the alumina body composition.

3. The method of preparing high quality alumina ceramic material for use in ceramic casting, comprising the steps of
   dry mixing a composition of 90% alumina, 6% talc and 4% clay for 15 minutes to 30 minutes;
   wet mixing the resulting composition with a water solution of a water retaining agent;
   hydraulically extruding the wet composition, without deairing, to form ⅛ inch diameter rods;
   drying the rods;
   breaking the rods into short lengths approximately ⅛ to ¾ inch long;
   firing the broken rods for ten hours approaching a final temperature of 2780° F.;
   soaking the rods at a high temperature level for approximately one hour;
   cooling the rods to room temperature;
   grinding the rods with water for 18 hours to form a slurry;
   adding 100% of deionized water during the last five minutes of grinding;
   screening the slurry to a 44 micron size;
   drying the screened slurry; and
   pulverizing the dried composition to form the resulting high alumina composition.

4. The method of preparing high quality alumina ceramic material for use in the firing of ceramic radomes, comprising the steps of
   dry mixing a composition of 90% alumina, 6% talc and 4% clay in a twin shell blender for 15 to 30 minutes;
   wet mixing the resulting composition with a 27% water solution containing 1% to 2% water retaining agent in a muller type mixer;
   hydraulically extruding the wet composition, without deairing, through a die having three openings to form ⅛ inch diameter rods;
   drying the rods in an electric dryer;
   breaking the dried rods into lengths ⅛ to ¾ inch long;
   firing the broken rods in a gas operated kiln for ten hours reaching a temperature of 2780° F.;

soaking the rods at the high temperature level for one hour;
cooling the rods to room temperature;
grinding the rods in an alumina ball mill with water for 18 hours to form a slurry;
adding 100% of deionized water during the last five minutes of grinding;
screening through a 325 mesh to form a 44 micron particle size;
drying the screened slurry; and
passing the dried composition through a micropulverizer turning at 8,000 r.p.m. thereby forming the resulting high alumina composition for use as a casting slip in the manufacture of radomes.

References Cited
UNITED STATES PATENTS

| | | | |
|---|---|---|---|
| 1,920,773 | 8/1933 | Walton | 106—71 |
| 3,238,048 | 5/1966 | Somers | 241—30 X |
| 3,252,809 | 5/1966 | Somers | 241—30 X |

GERALD A. DOST, *Primary Examiner.*